Aug. 16, 1966  G. W. BARR  3,266,225
BAG HOUSE FACILITY
Filed Aug. 4, 1965  6 Sheets-Sheet 1
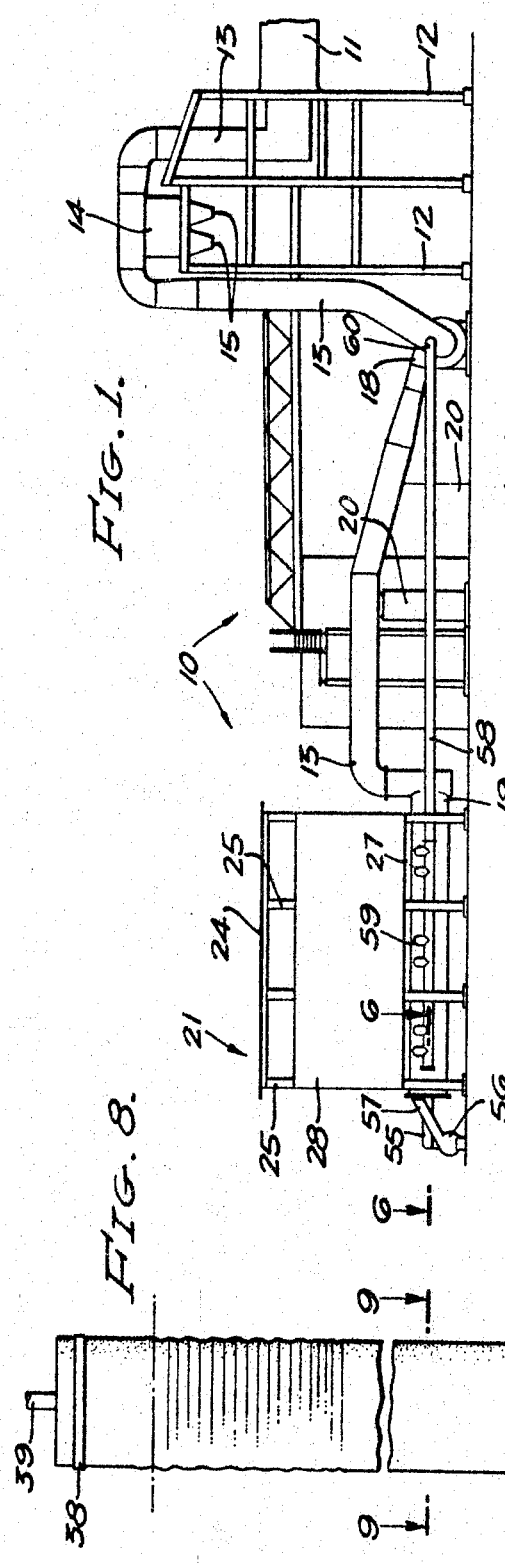
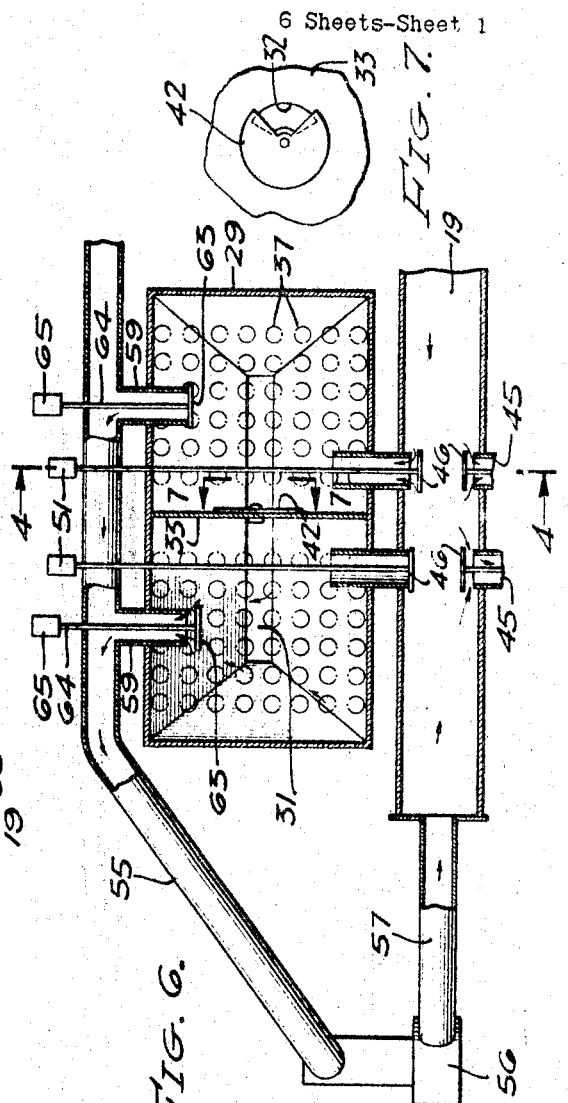
INVENTOR.
GORDON W. BARR
BY
ATTORNEY

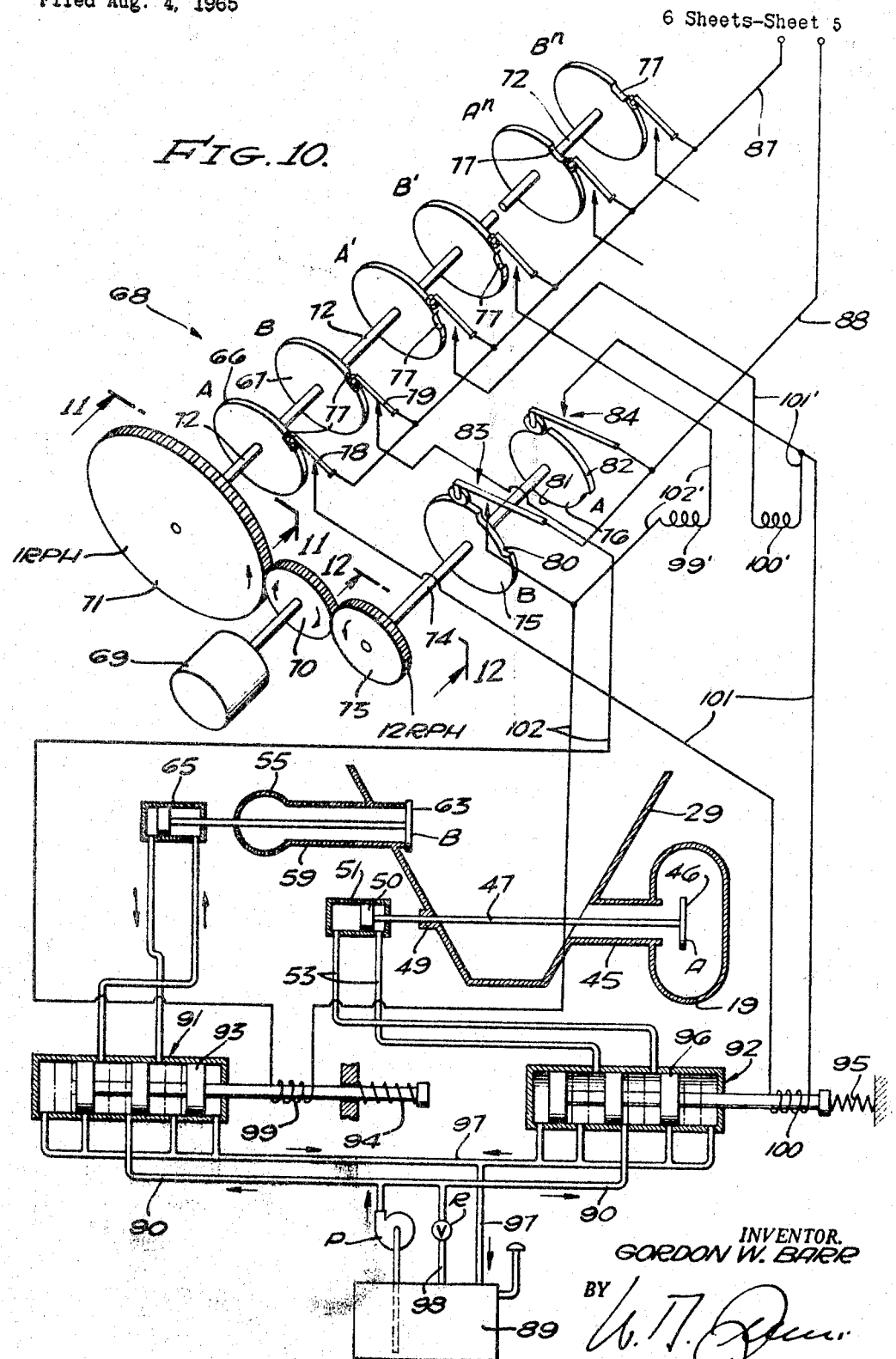

Aug. 16, 1966 G. W. BARR 3,266,225
BAG HOUSE FACILITY

Filed Aug. 4, 1965 6 Sheets-Sheet 6

INVENTOR.
GORDON W. BARR
BY
ATTORNEY

3,266,225
BAG HOUSE FACILITY
Gordon W. Barr, Pasadena, Calif., assignor to Southwestern Portland Cement Company, Los Angeles, Calif., a corporation of West Virginia
Filed Aug. 4, 1965, Ser. No. 752,986
27 Claims. (Cl. 55—273)

This invention relates to bag houses and more particularly to an improved construction designed to operate continuously at high efficiency and capable of filtering large quantities of undesirable contaminants from the gases discharged by industrial processing equipment as for example a continuously operating cement kiln.

A typical cement kiln discharges approximately 6,000,000 cubic feet of high-temperature, dust-laden gases per hour, there being many tons of dust carried in these gases during each twenty-four hours of daily operation. Formerly the problem of attempting to separate such quantities of extremely fine dust from this huge volume of gas presented grave problems. To safeguard against the escape of this dust during recent years, there has been proposed a great variety of dust collectors including bag houses, dust chambers, cyclones and electro-static precipitators. Owing to the huge volume of hot gases with variable moisture content and of dust to be handled these various types of collectors, of necessity, are bulky and costly. An ever present problem encountered in all types is the provision of effective means for removing separated dust in a manner maintaining as nearly uniform as possible the efficiency of the separating operation. The problems are aggravated if the wet process of cement making is employed since the gases discharging from the kiln contain large quantities of water vapor which condense and cake dust filtering equipment if the gas temperture falls below the dew point.

Inasmuch as the present invention concerns the bag house type separator, particular mention will be made of the problems encountered by designers of this type collector. As heretofore designed, bag houses characteristically comprise a large vertical enclosure for a number of tubular filter bags held suspended in various ways and opening at their lower ends into a distributing chamber for the dust-laden stream issuing from a dust source such as an operating cement kiln. As this dirty stream passes axially through these bags and through the porous walls thereof, the dust separates out and falls into an underlying hopper or accumulates as a layer on the interior surface of the bags. After a short period of operation the accumulated layer increases the back pressure to such an extent that continued filtering operation is impractical and it is necessary to interrupt filtering operations in that bag house until the dust layer can be removed and the filtering capability restored. Discontinuing the operation of the bag house for cleaning purposes necessitates the provision of an aditional or standy-by bag house to which the dust-laden stream can be shunted during the reconditioning operation.

In order to reduce the investment represented by the provision of duplicate bag houses, various attempts have been made to shut off one portion of the bag house for cleaning purposes while the remainder continues in regular operation. Although such designs have been successful to the extent that they avoided the need for full size duplicate bag houses, they have been subject to many disadvantages and shortcomings which are obviated by the present invention. Among the features characteristic of prior bag houses designed for continuous operation is the elimination of the shaker mechanism, or scraper suction cleaning mechanisms of any kind, having for their purpose the forced removal of the accumulated dust layer from the inner surface of the filter bags.

For example, it has been essential heretofore to provide some type of mechanical equipment for forcibly removing the accumulated dust layer. In one type of equipment, use of the filter is discontinued and the bags are subjected to vigorous shaking by mechanical shakers. Such shakers, though effective as dust dislodgers, are expensive to construct and operate and result in very short bag life. This is particularly true where the bags are formed of temperature resistant synthetic materials such as fiberglass wihch cannot withstand repeated flexure. Other types of mechanical devices make use of traveling scrapers and suction devices mounted within the filter bags. Some of these permit continuous cleaning while the bag remains in operation. However, all are objectional from cost and maintenance viewpoints and interfere with the flow of gases within the bags. Periodic shutdown is also necessary to remove accumulated foreign matter from this bag cleaning equipment.

Still another disadvantageous characteristic feature of prior bag house designs is the enclosure of the filter bags within a structure substantially closed to the surrounding atmosphere except for air inlet and outlet openings of inadequate size and location. These bag house designs are unsuitable for use in filtering very hot gases issuing from boilers, furnaces and kilns because of the inability of the filtering fabric to withstand high temperatures and fail after a short period of service. According to this invention, these and related problems are handled most satisfactorily by a bag house design freely open to the atmosphere in a zone surrounding the bag house immediately between the roof and the top portions of the filter bags. The admission of atmospheric cooling air to the lower portions of the bag house is arranged to be controlled in such manner as to provide for the cooling of the bags to a temperature approaching but above the dew point. Preferably provision is made for the circulation of large volumes of atmospheric cooling air by convection upwardly through the bag house. Restriction on the flow is conveniently provided by covering or uncovering the grillwork catwalks at the base of the filter bags by lightweight panels of plywood or the like.

By the present invention there is provided an improved and simplified bag house of the self-cleaning type so designed as to obviate the disadvantages and shortcomings of prior designs including those referred to above. More specifically, the bag house of the present invention is characterized in particular by its simplicity of design and mode of operation, and more particularly in that the bags are supported by fixed means free of movable shaker, scraper, beater or suction cleaning nozzles of any character for removing dust layers therefrom. Instead, the present invention provides a bag house operating continuously at uniform efficiency for periods of months without need for shutdown. Provision for continuous reconditioning of the filter bags relies upon a suction fan and sequentially actuated control valves for periodically cleaning each section of the filter bags without interference with the operation of the remainder. An important feature of the reconditioning operation is the use of sub and super-atmospheric pressures in mutual cooperation to impress a traveling annular wave upon the bag wall of a type highly effective in dislodging adhering dust therefrom thereby obviating the need for mechanical cleaning devices of the various types heretofore considered essential. The use of the traveling wave in the bag walls progressively shears the dust layer from the bag wall with minimum flexure of the fabric and contributes to the effectiveness and speed of the cleaning operation as well as to the long life of the bag fabric.

Another feature of the present invention is the provision of a bag house and the associated duct means for conveying a dust-laden stream thereto from a cement kiln in such manner that the very high temperatures of the gases issuing from the kiln are reduced sufficiently to avoid injury to the fabric used for the filter bag yet sufficiently above the dew point of the moisture in the dirt stream to avoid wetting of the dust layer and the caking thereof. These objectives are accomplished by the cooperative action of several factors including the use of the ducting for the dust-laden stream as a heat exchanger, to the number and surface area of the filter bags maintained continuously in operation, to the exposure of the filter bags throughout their lengths to the ambient atmospheric air, and to the introduction of relatively cool atmospheric air used in reconditioning a filter cell to the hot, main gas stream.

Accordingly, it is a primary object of the present invention to provide an improved apparatus and method for continuously processing large volumes of high-temperature, dust-laden products to separate dust therefrom.

Another object of the invention is the provision of an improved bag house facility for use with continuously or intermittently operating sources of dust-laden gases and wherein less than the total number of similar filtering cells are employed at any one time for filtering, and wherein all cells are periodically and sequentially reconditioned.

Another object of the invention is the provision of a continuously operating bag house for use with cement kilns and the other sources of contaminated gases and wherein the individual filter bags are suspended stationarily and are adapted to be cleaned periodically by imparting a traveling wave in the walls thereof as the walls are snapped taut after being deflated thereby dislodging adhering dust.

Another object of the invention is the provision of a large capacity self-cleaning, continuously operating bag house featuring a plurality of filtering cells each having a number of filter bags stationarily supported at their ends and featuring means for cleaning the same by deflating the bags and thereafter suddenly inflating the bags with snap action using pressurized dust-laden gases.

Another object of the invention is the provision of an automatic self-cleaning bag house utilizing reversal of flow to deflate the filter bags following which the bags are suddenly inflated to dislodge adhering foreign matter.

Another object of the invention is the provision of improved programming mechanism automatically operable to select a section of the filters to be reconditioned as the other sections remain in operation and featuring separate timer means for sequentially opening and closing flow control valves for the selected section in predetermined timed sequence.

Another feature of the invention is the provision of a bag house having a plurality of tubular filter bags supported vertically and opening at their lower ends into a dust collecting device, and featuring means for reversing the normal flow of gas outwardly through the bags for a sufficient period to collapse the bag walls inwardly following which the pressurized normal flow of contaminated gases into the upper ends of the bags is suddenly resumed in a manner snapping the walls taut and dislodging adhering contaminants for downward discharge in the downwardly moving gas stream.

Another object is the provision of bag house for use in filtering high temperature gases, the bag house being enclosed along its sides but open to the atmosphere at its upper roofed end and at its lower end, said bag housing including means for controlling the flow of atmospheric cooling air therethrough to maintain the bag walls at a temperature above the dew point of the gases being filtered.

Another object of the invention is the provision of a sectionalized bag house making use of reversal of flow to dislodge adhering contaminants and featuring control valve means for regulating the snapping action accompanying the re-inflation of the bags after deflation.

Another object of the invention is the provision of a filtering facility featuring the use of gas under sub-atmospheric and super-atmospheric pressures to recondition the filters periodically by first deflating the filters and abruptly re-inflating them thereby flexing the walls and snapping them taut to dislodge adhering contaminants. Although certain economies are available if the pressurized gas is also the gas undergoing filtering it will be understood that substantially clean gas may be used to deflate and to re-inflate the filters, if desired.

These and other more specific objects will appear upon reading the following specification and claims and upon considering in connection therewith the attached drawings to which they relate.

Referring to the drawings in which a preferred embodiment of the invention is illustrated.

FIGURE 1 is a side elevational view of a bag house filtering facility including its duct connection with the gas outlet of a cement kiln;

FIGURE 6 is a transverse fragmentary view taken along line 6—6 on FIGURE 1 and showing the inlet and outlet valves for one filter section properly positioned for cleaning and for the return of the reverse flow air stream to the dust-laden stream flowing to the remaining filter sections;

FIGURE 7 is a fragmentary elevational view taken along line 7—7 on FIGURE 6 showing a damper valve for temporizing the severity and suddenness of the traveling wave imparted to the bag walls during the bag cleaning operation;

FIGURE 8 is an elevational view of one filter bag showing a traveling wave passing therealong during cleaning;

FIGURE 9 is a transverse view taken along line 9—9 on FIGURE 8 and showing the collapsed condition of the bag wall during the deflation portion of the cleaning cycle;

FIGURE 10 is a schematic view of a representative portion of the automatic control mechanism for sequentially reconditioning the filter sections;

Figure 2:
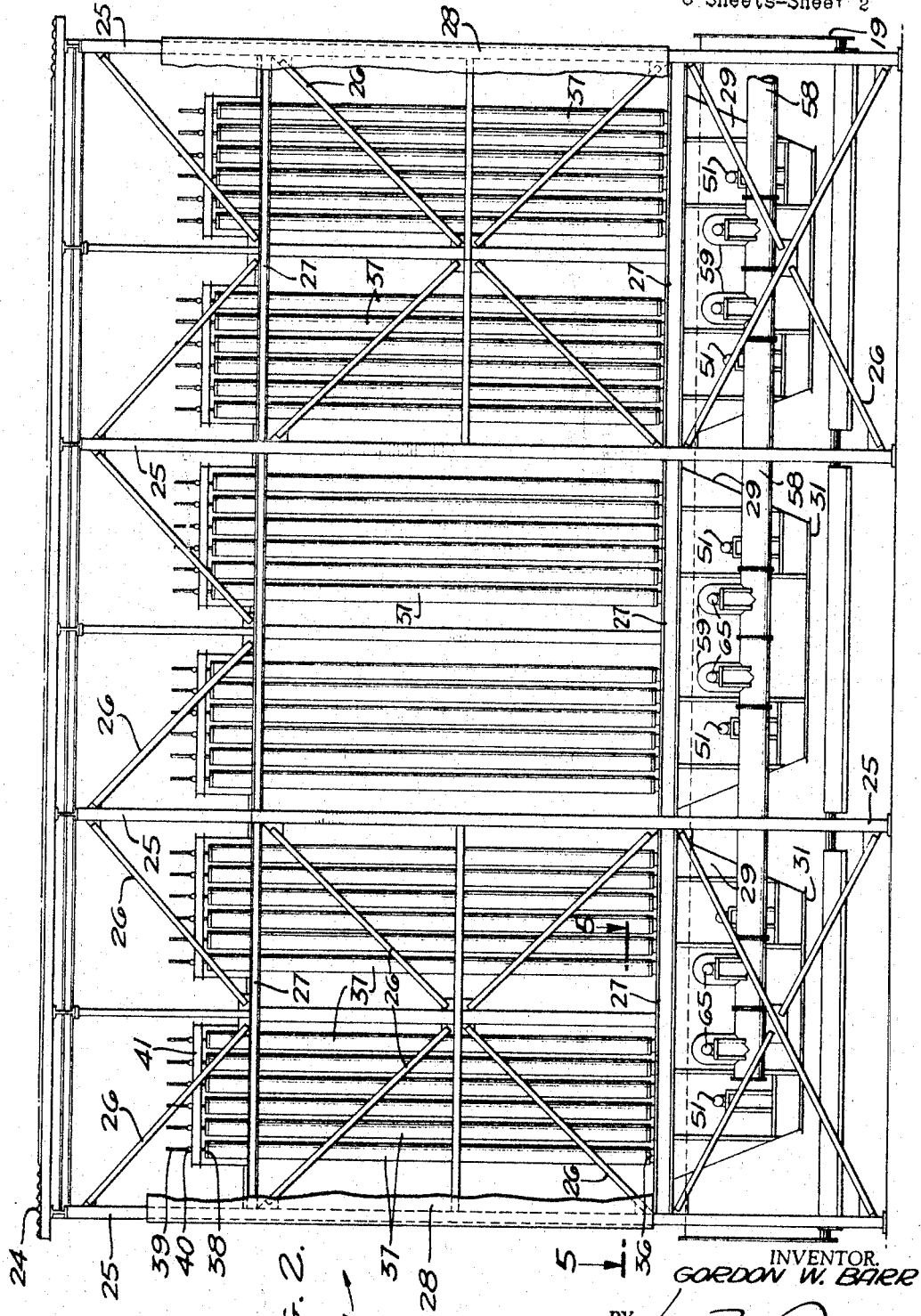
FIGURE 2 is a side elevational view on an enlarged scale of the bag house illustrated in FIGURE 1.

Referring to the drawings and more particularly to FIGURE 1, there is shown a bag house facility designated generally 10 incorporating features of the present invention and including as an example of a source of high-temperature contaminants a continuously operating rotary cement kiln of conventional design having its axis inclined slightly to the horizontal. It will be understood that the kiln is supported in the usual manner with gas outlet 11 suitably supported in framework 12, the right-hand half of framework 12 including at its upper end suitable facilities, not shown, for feeding the kiln with the raw materials to be processed therein. Gas outlet 11 leads directly into a large diameter duct 13 extending upwardly to the top of framework 12 and through suitable cyclone separators 14 comprising centrifugal dust separators wherein a considerable volume of the heavier constituents of the dust settle out for removal through hoppers 15 into which the cyclones discharge. The dust laden stream depleted of its heavier constituents continues through duct 13 which extends downwardly into the inlet of a heavy duty blower 18 which raises the pressure of the stream very appreciably above atmospheric pressure forcing it to flow rapidly through following portions of duct 13 and into manifold 19 extending lengthwise of the bag house. As is indicated in FIGURE 1, duct 13 is suitably supported throughout its length by suitable frameworks or bents 20, 20.

The bag house proper, designated generally 21, suitable for housing the filter sections required in separating dust from approximately 6,000,000 cubic feet per hour of cement kiln gases, comprises a building having a framework measuring approximately twenty-seven feet in width and sixty-five feet in length and having a height of fifty feet. Preferably, and as herein shown, this building comprises a structural steel framework provided at its top with suitable roofing 24. The main supporting columns 25 are suitably crossbraced by cross-members 26 and by horizontally disposed stringers 27. It will be understood that bag house 21 is preferably covered along its sides and across its ends with suitable paneling or siding 28, such paneling extending from stringers 27 to a level somewhat above the upper ends of the tubular filter bags.

Rigidly secured to and supported by the lower row of stringers 27 are two rows of dust hoppers 29 extending lengthwise of the bag house along either side thereof, there being three such hoppers in each row, although it will be understood that this number may vary. As is made clear by FIGURES 2 and 4, each of the hoppers 29 has downwardly converging side and end walls terminating in a dust outlet 30 normally closed by any suitable closure member, such as 31, through which the collected dust may be removed periodically. A transverse partition 33 (FIGURE 6) serves to divide each hopper into a pair of similar dust compartments sealed from one another. Partitions 33 are preferably provided with a vent passage 32 (FIGURE 7) which can be regulated by an adjustable rotary valve sector 42 (FIGURES 6 and 7) to control the volume of gases which can pass between sections of hoppers 29 during the filter cleaning operation as will be explained more fully presently. Extending horizontally across the upper end of each hopper 29 is a closure plate 34 provided with a large number of openings having upstanding from each a thimble 35 to the upper end of which is clamped, as by bands 36, the lower end of a fabric filter bag 37.

In the bag house here illustrated, each half of hoppers 29 forms part of a filtering section or cell, each section including a plurality of filter bags consisting of six rows of eight filter bags each. The forty-eight bags constituting a single filtering section are in communication with one another by way of the underlying half of hopper 29 to one side of partition 33. Although it will be understood the number, arrangement and dimensions of the filter bags in each filtering section may vary widely, it has been found in actual practice that twelve similar sections of filters, each having forty-eight filter bags approximately one foot in diameter and twenty-five feet in height, provides high efficiency, continuous filtering capacity adequate to handle the output from a single cement kiln 330 feet in length and discharging approximately 6,000,000 cubic feet of dust-laden gas per hour. Preferably the filter bags are made of fabric capable of resisting relatively high temperatures as is found necessary in practice to avoid the caking of dust layers on the interior surfaces due to cooling of the gases below the dew point. For this reason it is necessary to forego available exterior cooling of the filter bags using atmospheric air and advantageous in that it would permit the use of a cheaper filter fabric. Suitable fabrics for fabric operating temperatures in excess of 225° F. include the synthetic material Dacron, fiberglass and others. Fiberglass is particularly resistant to higher gas temperatures.

Desirably, the upper end of each filter bag is attached to an end cap as by a removable band 38, the end caps being arranged for individual support by suitable means such as threaded rods 39 and flanged nuts 40 bearing against the upper side of a rigid supporting structure 41. It is pointed out that the supporting nuts 40 are individually adjustable along threaded rods 39 as necessary to place the associated individual filter bags 37 under a desired tension and yet does not interfere with the collapse of the walls against one another during deflation (FIGURE 9).

Figure 5:
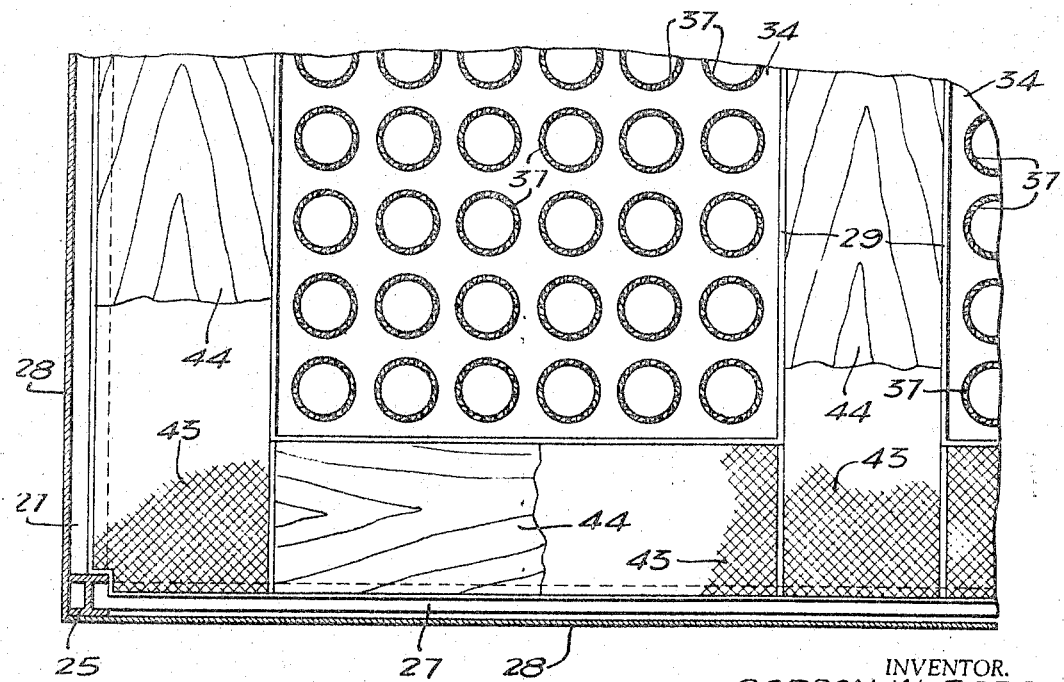
FIGURE 5 is a fragmentary transverse sectional view through a portion of a filtering cell as taken along 5—5 of FIGURE 2 and showing the movable panels for controlling the flow of atmospheric cooling air.

As is best shown in FIGURE 5, both the upper and the lower ends of the filters in each cell are surrounded by walkways 43 of grillwork or the like providing workmen with ready access to the filter clamping bands 36 and 38 while servicing or replacing the filter bags. Additionally, and importantly, grillwork 43 permits the upward flow by convection of the desired volume of atmospheric cooling air to cool the fabric walls of the filter bags 37. Suitable control means for limiting the air flow to avoid cooling of the walls below the dew point of the moist gases being filtered may consist of easily handled lightweight panels 44 of plywood or the like. These can be provided in any desired width and length and can be overlapped or placed on edge manually to regulate the flow of cooling air. Normally a given adjustment of the panels will suffice for a prolonged operating period.

Figure 3:
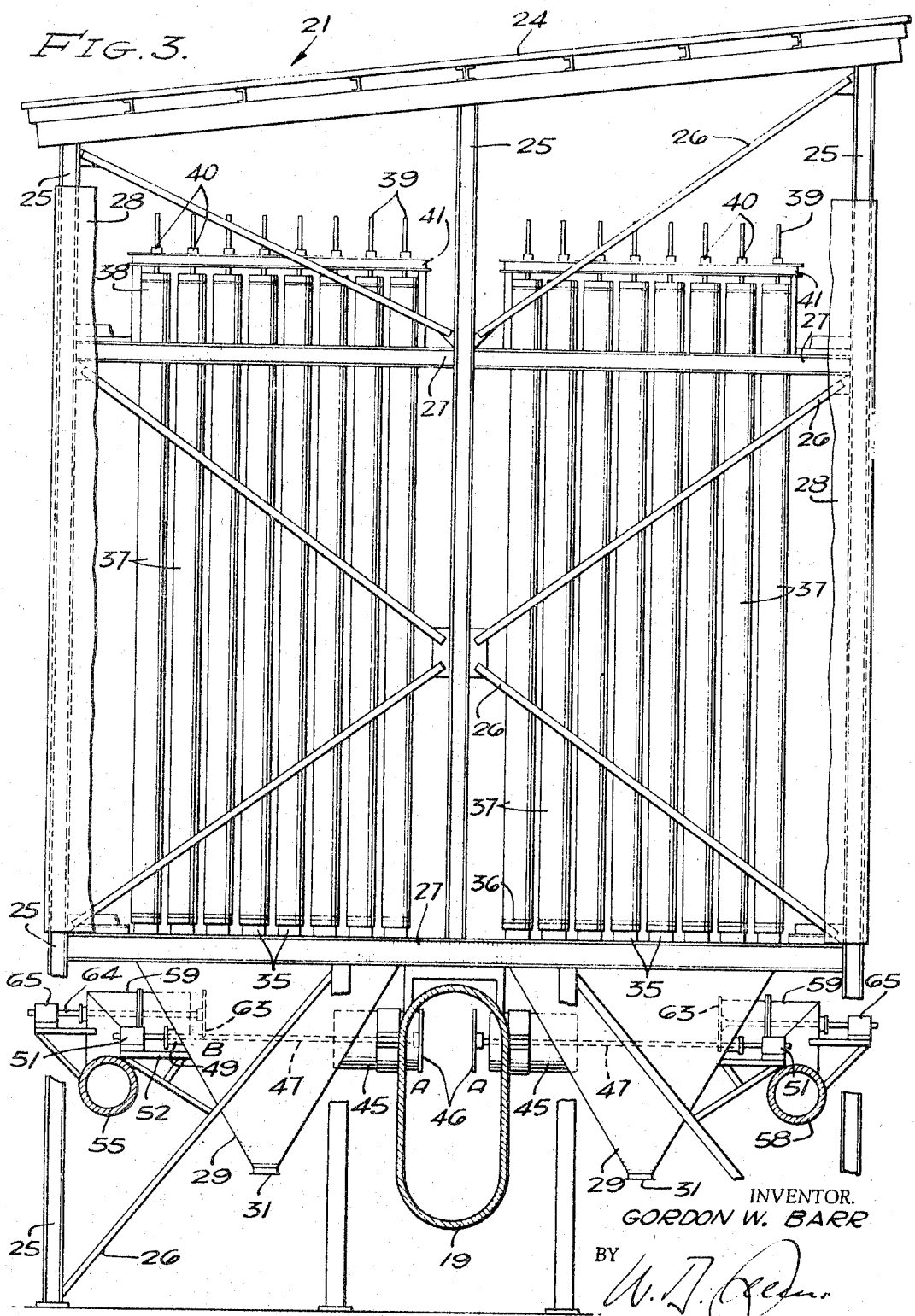
FIGURE 3 is an end elevational view of the bag house shown in FIGURE 2.
Figure 4:
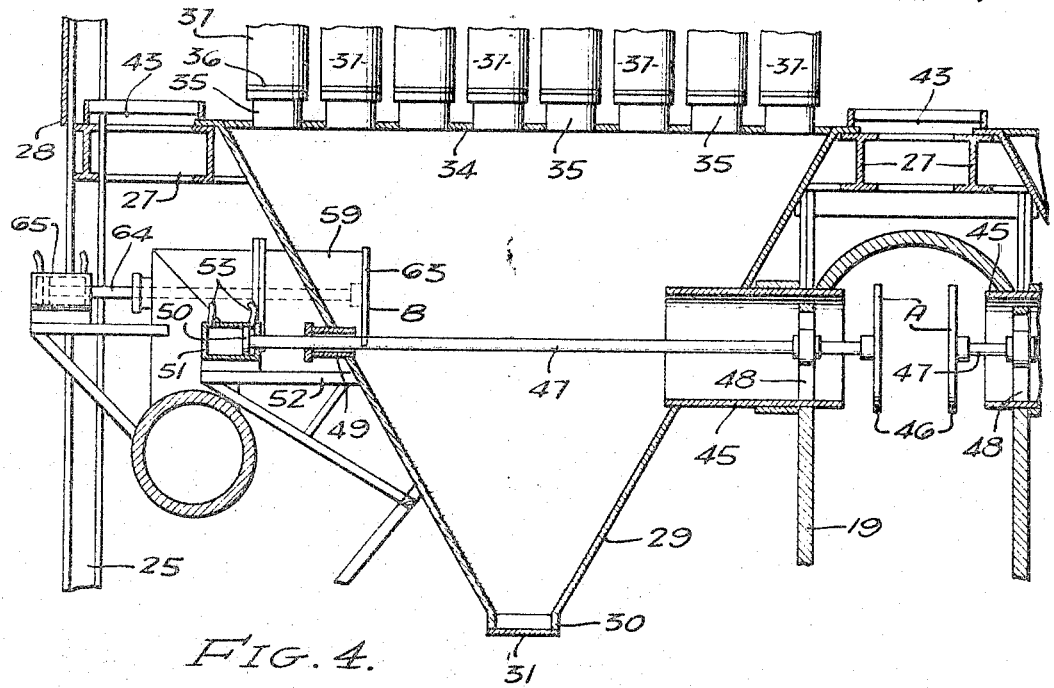
FIGURE 4 is a transverse vertical sectional view taken on line 4—4 of FIGURE 6 and showing one pair of inlet and outlet valves properly positioned for normal filtering operation.

The means for distributing the dust-laden stream from manifold 19 into each section of the dust hoppers will be best understood by reference to FIGURES 3 and 4 showing a distributing duct 45 projecting laterally from either side of manifold 19 and into each compartment of the dust hoppers. Associated with the inner end of each distributing duct 45 is a disc valve 46 supported on a control rod 47 slidably mounted in a spider 48 of each duct 45 and projecting through a packing bushing 49 on the far side wall of each hopper 29. The outer end of each rod 47 is fixed to a piston 50 enclosed in a hydraulic cylinder 51 rigidly supported on a bracket 52 of the hopper. Suitable hydraulic fluid conduits 53, 53 communicate with the opposite ends of cylinder 51 and extend to a controlled source of pressurized hydraulic fluid by which inlet valves 46 can be moved between the open position thereof shown in FIGURES 3 and 4 and their closed position across the end of duct 45. It will therefore be understood that the flow of dust-laden gases can be cut off from or admitted at will to the hopper of any selected filtering section of the bag house.

The means by which each of the filtering sections may be selectively reconditioned in rotation while the remaining filtering sections continue in use to filter will now be described, reference being had to FIGURES 2, 3, 4, and 6. For purposes of illustration two suitable duct arrangements are shown for returning the reconditioning air and the dust suspended therein to main distributing manifold 19. For example, the filtering sections and associated dust hoppers 29 on the far side of the bag house, as viewed in FIGURE 6, utilize a dust return duct 55 opening into the intake of a suction blower 56, the outlet side of which is connected to manifold 19 by a duct 57. The filtering sections and associated hoppers 29 on the near side of the bag house as illustrated in FIGURE 2, employ an alternate return system comprising a dust return duct 58 having its inlet end connected through outlet elbows 59 with each of the dust chambers in hoppers 29 and its discharge end 60 opening into the main stream duct 13 on the inlet side of blower 18 (FIGURE 1). Accordingly, it will be recognized that the reconditioning or filter cleaning air may be circulated inwardly through the filter bag and returned to main manifold 19 either by a separate blower, such as blower 56, or in the alternative, by main blower 18. In both arrangements, the relatively cool air flowing in duct 55 or in duct 58 is merged with the much hotter dust-laden gases and is effective to cool these hot gases.

Irrespective of which mode is employed for returning the reconditioning air to manifold 19, it will be understood that the return ducts 55 and 58 communicate with the dust chambers of the adjacent hoppers through ducts 59, the inner ends of which form an outlet from the respective hoppers. These outlets are controlled by a disc valve 63 mounted on an operating rod 64 connected at its outer end to a piston enclosed by a hydraulic cylinder 65 similar to cylinders 51.

Figure 11:
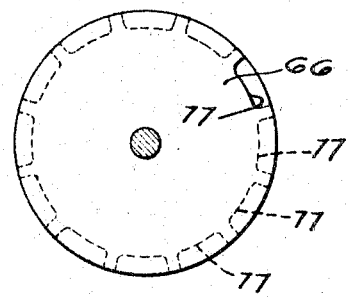
FIGURE 11 is a view taken along line 11—11 on FIGURE 10 showing the uniform echelon arrangement of the cam selectors for reconditioning the filter sections.
Figure 12:
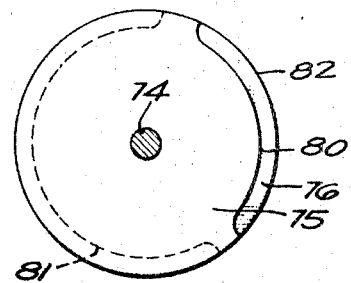
FIGURE 12 is a view taken along line 12—12 on FIGURE 10 showing the relationship of the timing cams controlling the filter reconditioning valves.

Referring now to FIGURES 10 to 12, there is shown automatic control mechanism designated generally 68 preferably employed in reconditioning the various filter sections sequentially in accordance with a predetermined programming cycle. The gang timer mechanism for the electrical circuitry is shown schematically at the top of FIGURE 10 in association with the hydraulic circuit employed to operate the flow control valves for a single one of the filter sections, it being understood that each of the remaining filter sections are similarly operated.

Programming timer 68 includes a master timing motor 69 having its output gear 70 meshing with a relatively large diameter gear 71 driving a selector cam shaft 72. Drive gear 70 also meshes with a gear 73 driving timer cam shaft 74 to which is fixed a pair of cams 75, 76. These cams govern the opening and closing of valves 46, 63 of the various filter sections in predetermined timed sequence, a feature of importance in the effective removal of accumulated contaminants from the interior of the filter bags. In the arrangement here shown, gears 70, 71 and 73 are so selected as to size that cam shaft 72 rotates once per hour whereas timer cam shaft 74 revolves 12 times per hour. It follows that with this programming arrangement all filter bags are reconditioned once per hour. It will be recognized that faster or slower cycling can be employed by varying the ratios of gears 71 and 73 or by varying the reduction gearing employed with the master timer motor 69. In all cases the number of revolutions of gear 73 is N times the number of revolutions of gear 71, N being the number of filter sections being reconditioned. Of importance too is the fact that the entire circumference of cams 75, 76 is available for the accurate measuring of the component parts of the cleaning cycle of each filter section.

Fixed to selector cam shaft 72 are pairs of similar selector cams, the first pair being indicated by numerals 66, 67. Each pair of cams 66, 67 has as its function the selection of a filter section to be cleaned by energizing operating cylinders used in opening and closing gas inlet valve 46 and the reverse flow air valve 63 associated with each filter section. Cams 66, 67 have similar cutouts 77 similarly oriented with respect to one another on shaft 72 and receive the cam followers of normally open switches 78, 79 thereby closing these switches. As shown in FIGURE 10, switches 78, 79 are closed when the cutouts 77 of operating cams 66, 67 are in the two o'clock position. It is pointed out that corresponding cutouts 77 of the other pairs of cams (designated A', B' and $A^n$, $B^n$) on selector shaft 72 are so positioned as to be out of phase with one another, as is best shown in FIGURE 11. For example, cutouts 77 for each pair of cams are arranged in echelon and spaced as are the hour designators for a clock, the visible pair of cutouts 77 in FIGURE 11 being in the 2 o'clock position, the next pair in the 3 o'clock position, etc.

Timer cams 75, 76 mounted on timer shaft 74 have a configuration such as that shown in FIGURES 10 and 12, cam 75 having a cutout 80 and cam 76 having a relatively long cutout 81 so formed as to leave a high portion 82, the opposite ends of which extend beyond the corresponding ends of cutout 80 in cam 75. The purpose of this arrangement will become evident in the detailed explanation of the operating cycle given below. Each of cams 75, 76 is associated with the follower of separate switches 83, 84 connected in series circuit with valve operating solenoids and with switches 79 and 78 of selector cams 66, 67. The movable element or cam follower of each of switches 78, 79 is connected through a common bus 87 to one side of a suitable source of power, and the cam followers of timer switches 83, 84 is likewise connected to the other side of the power source through a bus 88.

The manner in which the switches described are operative to control the opening of valves 46 and 63 will now be described by reference to the hydraulic circuit shown in the lower portion of FIGURE 10. Hydraulic fluid contained in a storage tank 89 is placed under pressure by a pump P for delivery through conduit 90 to conventional four way control valves 91 and 92 associated respectively with the opposite ends of hydraulic cylinders 65, 51 for operating the reverse flow outlet valve 63 and gas inlet valve 46 of one filter section taken by way of example. The axially slidable spool element 93 of valve 91 is normally biased by spring 94 to occupy the full line position shown wherein pressurized fluid flows to the right-hand end of cylinder 65 to hold valve 63 closed. Similarly under normal operating conditions spring 95 holds spool element 96 of valve 92 in its full line position wherein pressurized fluid is supplied to the left-hand end of cylinder 51 to hold gas inlet valve 46 open. The opposite ends of cylinders 51 and 65 are then in communication with storage tank 90 through fluid return line 97. Pump P may operate continuously to maintain a desired fluid pressure in the pressurized portions of the circuit, any excess fluid being returned to the tank through line 98 provided with the usual pressure relief valve R.

The means for shifting spool elements 93 and 96 in opposition to springs 94 and 95 is here shown as comprising solenoid coils 99 and 100, respectively, it being understood the showing here made is schematic and that each is operative in known manner when energized to move the associated spool element from the full line to the dotted line position. Solenoid coils 99 and 100 are interposed between an associated pair of selector-timer switches and are therefore energized only so long as a given pair of these switches is closed. Thus coil 100 is connected between the normally open contacts of switches 66 and 84 by lead wires 101 and coil 99 is connected between normally open contacts of switches 79, 83 by lead wires 102. Likewise solenoid coils 99', 100' for the control valves of the next adjacent filter section are similarly connected by leads 102' and 101', respectively, between the same pair of timer switches 84, 83 and the selector switches operated by selector cams A', B'. Accordingly, it is unnecessary to show the complete control circuit since it will be readily understood from the foregoing description.

Before proceeding with the description of the operation of the bag house, it is desired to point out that, for convenience, the letter A designates an associated set of components comprising an inlet valve 46, a selector cam 75 and a precision timer cam 76, whereas the letter B designates a corresponding set for the same filter section comprising an outlet valve 63, a selector cam 76, and a precision timer cam 75. Selector cams A', B', on shaft 72 correspond to selector cams A and B. Selector cams $A^n$ and $B^n$ represent the selector cams for the last of an indefinite number "$n$" of filter sections to be reconditioned. It is further pointed out that the solenoid coils for each of the four way valves employed to control the operation of the inlet and outlet valves of the different filter sections are connected in series with the timer switches 83, 84 and a particular pair of the selector switches in the manner clearly shown in FIGURE 10.

In the operation of the described dust collecting facility it will be appreciated that when the dust bags of all filtering cells are clean, as they are initially, each of outlet valves 63 will be closed and each of the inlet valves 46 controlling the flow of dust-laden gas into distributing ducts 45 will be open. Accordingly, under these conditiins main blower 18 and the connected ducts are effective to convey dust-laden, high-temperature gases from the cement kiln to cyclones 14 where the heavier particles are removed centrifugally. Thereafter, the gases pass through the blower and along duct 13 at a pressure appreciably above atmospheric, it being understood that the length of duct 13 preferably is so chosen that large quantities of heat are dissipated to the atmospheric air and so as to lower the temperatures of the gases to a value between 500 and 600 degrees F. as they enter manifold 19. Additional temperature losses occur as the gases pass along this manifold.

The super-atmospheric gas pressure maintained by blower 18 inflates the filter bags as the gases seep outwardly through their side walls leaving the dust deposited in hoppers 29 or as a thin layer on the interior surfaces of the bags.

After a brief interval of operation, the timer will select the first filter section for reconditioning and cleaning, the selection being definitely determined, for example, when the followers of switches 78, 79 fall into cutouts 77. Once a particular filter section has been selected for reconditioning, precision timer cams 75, 76 assume control. The opposite ends of the high portion 82 of timer cam 76 extend beyond the opposite ends of cutout 80 in timer cam 75 with the result that switch 84 controlling the position of gas inlet valve 46 is closed before switch 83 and remains closed for a short interval after switch 83 opens. In this manner, assurance is provided that gas inlet valve 46 closes before outlet valve 63 opens and likewise assures that valve 46 will reopen a predetermined time period after valve 63 has reclosed. This time delay in the operation of valves 46 and 63 is important for several reasons but particularly because of the vigorous and effective cleaning action achieved in the final phase of the reconditioning operation. In practice a delay of 10 to 15 seconds between the operation of valves 46 and 63 at either end of their operating cycles is found adequate and to provide highly satisfactory results, it being understood that this delay period will vary in accordance with the size of the installation, the operating pressures and other factors.

Assuming that cam 76 has operated to close switch 84, the circuit through coil 100 of spool valve 92 is energized causing spool 96 to be moved to the dotted line position indicated in FIGURE 10 thereby allowing pressurized fluid to pass to the right-hand end of cylinder 51 to close valve 46. By the time this valve has closed, timer cam 75 will have rotated sufficiently to close switch 83 energizing solenoid coil 99 thereby shifting spool element 93 to the left as viewed in FIGURE 10. This allows pressurized fluid to flow to the left end of cylinder 65 opening valve 63 so that blower 56 is effective to suck atmospheric air inwardly through the walls of the filter bags in the section being reconditioned, such air being drawn downwardly through the filter bags past valve 63, through ducts 59, 55, 58 and into manifold 19 (FIGURE 6). The air filtering inwardly through the filter dislodges the layer of collected dirt so that it falls into hopper 29 as the sub-atmospheric suction pressure collapses the filter bag walls toward one another in the pattern indicated in FIGURE 9. When this condition is reached there is relatively little air flowing inwardly through the filter bags, a condition normally achieved in about 1 to 1½ minutes of reverse air flow, or the time required for cutout 80 of timer cam 75 to rotate past the cam follower of switch 83. When this occurs, switch 83 opens de-energizing solenoid 99 and allows spring 94 to return spool element 93 to its full line position as shown in FIGURE 10 thereby effecting the closure of outlet valve 63. As closure of valve 63 takes place, cam 81 allows switch 84 to open de-energizing solenoid coil 100 allowing spring 95 to reverse the position of spool 96 and to open gas inlet valve 46.

The operation following reopening of valve 46 is particularly important as respects the dislodgement of dust still adhering to the bags. The contaminated gases in manifold 19, being under super-atmospheric pressure, flow rapidly into hopper 29 where desirably sub-atmospheric pressure conditions prevail. The resulting reversal of pressure in hopper 29 causes the collapsed filter bags to be re-inflated progressively from their inlet ends toward their upper closed ends. As the bags approach their re-inflated condition, a traveling wave is set up in the side walls. The resulting undulations in the side walls of the bag, proceeding as they do from end to end of the filter, appear to provide a highly effective shearing action serving to separate any remaining dust layer from the bag wall, this shearing action advancing progressively along the filter bag as the traveling wave proceeds upwardly therealong. Additionally and importantly, the final stage of re-inflation of the bag occurs near the closed end of the bag with a rather severe snapping action making a report audible a considerable distance from the bag house. This final snapping action is also very effective in dislodging final traces of adhering contaminants.

In fact, it is found in practice that the snapping action indicative of the final stage of re-inflation can damage the bag due to its suddenness and force. This hazard can be avoided by the simple expedient of properly adjusting the bleed connection provided in partition 33 separating the hopper for the portion of the filter undergoing cleaning from an adjacent hopper (FIGURES 6 and 7). Control of the bleed opening is achieved by adjusting control disc 42, 42 with respect to the bleed passage 32 to control the bleeding of pressurized gases into the filter section undergoing cleaning. Accordingly, it will be appreciated that the different pressure conditions in adjacent chambers of the described filtering facility can be availed of to expedite and control the vigorousness of the filter cleaning operation.

Since cutouts 77 in selector cams 75, 76 are of sufficient arcuate extent to maintain switches 78, 79 closed throughout a complete revolution of timer shaft 74, assurance is provided that switches 78, 79 will remain closed until the selected filter section has been cleaned. Shortly thereafter, cams A', B' for the next filter section will be in position to close the associated switches thereby selecting the next filter section for cleaning under the control of timer cams 75, 76. The next closing of timer switch 84 energizes solenoid coil 100' to close inlet valve 46 of the selected filter section. Shortly thereafter, timer switch 83 closes thereby energizing solenoid coil 99' to open outlet valve 63 of the same selected filter section. In this manner, it will be understood that the various solenoid coils are energized sequentially by selector shaft 72 in cooperation with precision timer cams 75, 76, the latter being used repeatedly to control cleaning of each filter section thereby assuring accurate and uniform results.

The described operation continues until selector shaft 72 has made a full revolution at which time each of the pairs of selector cams will have been brought into operation to select a different one of the filter sections for cleaning and reconditioning. Thereafter, the control mechanism automatically repeats the cycle of operation maintaining the filters at substantially maximum operating efficiency at all times. Due to the frequency of recycling, an insufficient layer of dust collects to reduce the filtering efficiency materially or to present any problem in dislodging the layer. It is never necessary to discontinue operation of the bag house which remains in operation with all except one filter section active at all times. Furthermore, the dust removed during the reverse cycling operation is returned to the main duct for separation in the active filter sections.

It will be recognized that in the arrangement shown in FIGURE 1 the reverse flow duct 55 connected with the filter sections on one side of the bag house discharges into suction fan 56, whereas the reverse flow duct 58 for the filter sections on the other side opens into the inlet side of main blower 18. Either mode of returning the reverse flow air is suitable and may be employed to the exclusion of the other or in combination.

Figure 13:
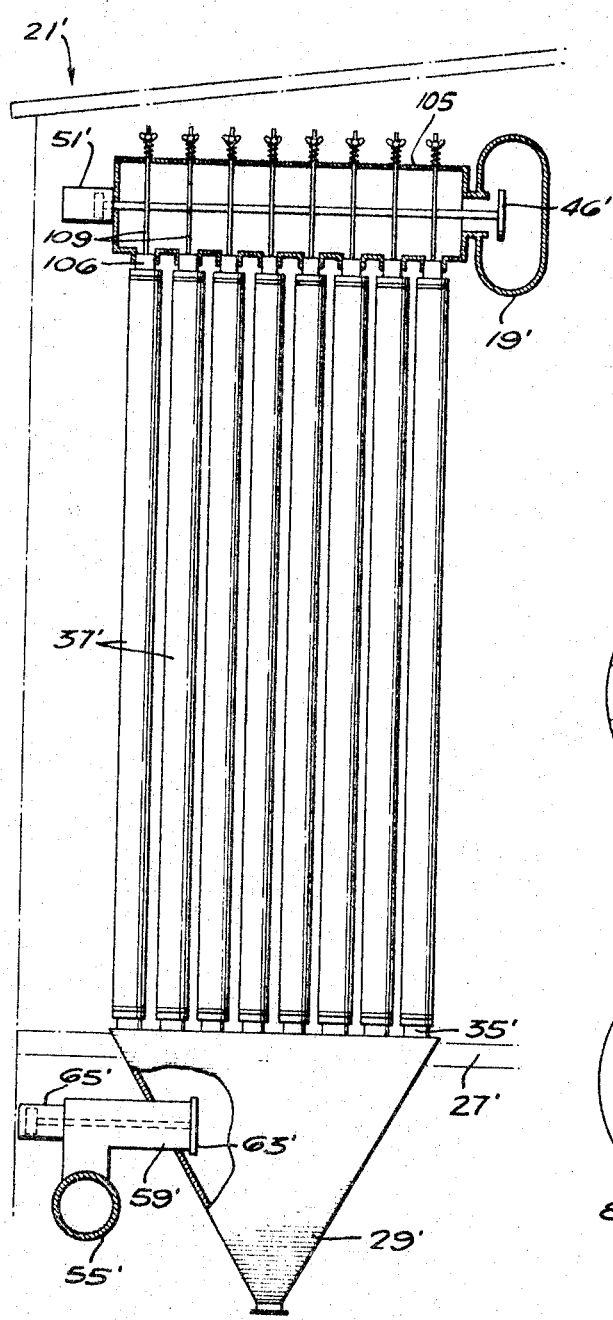
FIGURE 13 is a fragmentary vertical view of a second embodiment of the bag house, parts being broken away to show structural details.
Figure 14:
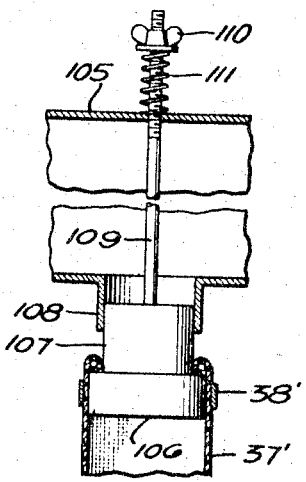
FIGURE 14 is a sectional view on an enlarged scale through one of the adjustable filter support couplings.

Referring now to FIGURES 13 and 14, there is shown a second preferred embodiment of the invention wherein the contaminated gas stream is distributed to the filter bags at their upper rather than their lower ends in order to facilitate the separation of the contaminants from the gas stream and their collection in the underlying hopper. The showing is somewhat diagrammatic and differs in no major respects from the first described embodiment. Accordingly, the same or similar parts are referred to by the same reference character as in the first embodiment but are distinguished therefrom by the addition of a prime. The principal difference resides in the fact that the contaminated gas distributing manifold 19' extends lengthwise of the bag house near the roof thereof and opens laterally into a large area header 105 suitably and rigidly supported by structural members not shown. The upper ends of filter bags 37' are secured by bands 38' to the larger diameter end of thimbles 106 having their upper ends slidably supported axially of a thimble 108 opening through the lower wall of header 105. Thimbles 106 are axially adjustable by means of resiliently supported suspension rods 109 the latter being secured to thimbles 106 through spiders or the like. The threaded upper ends of rods 109 project through the header and compression springs 111 are provided with wing nuts or the like 110 by which the tension in the filter bags can be adjusted.

It is pointed out that the FIGURE 13 arrangement is preferably equipped with the described automatic control and operates in the same manner as the first described embodiment except that the dust-laden gases enter the tops of the filters. Additionally and importantly, re-inflation of the filters near the end of the filter cleaning cycle for a given section starts at the top of the bags and progresses downwardly with the result that the snapping action occurs near the bottom of the bags rather than at the tops. Accordingly, the peeling of the dust layer by the traveling wave set up in the bag walls characteristic of re-inflation allows the dislodged dust layer to fall downwardly along with the advancing gas stream thereby facilitating the ejection of dislodged dust into hoppers 29' as the walls snap taut.

While the particular continuously-operable automatic recycling and self-cleaning bag house herein shown and disclosed in detail is fully capable of obtaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a filtering facility for removing contaminants carried in a gas stream, said facility being of the type having a main frame, a plurality of groups of flexible tubular filters stationarily supported at their opposite ends by said main frame and continuously open at one end into collector means for filtered contaminants, the walls of said tubular filters being unrestrained and free to collapse against one another and thereby substantially cut off flow along their interiors, and means for delivering the gas stream to said filters under super-atmospheric pressure through the continuously open end thereof thereby normally maintaining said filters inflated; that improvement which comprises means for removing adhering contaminants from the filter walls of one of said filter groups by momentarily drawing a partial vacuum on the filters thereof to collapse the filter walls against one another thereby substantially cutting off gas flow along said collapsed filters, and means for thereafter suddenly resuming the supply of said contaminated gas to said collapsed group of filters to reinflate the filter walls abruptly and with snap action to dislodge adhering contaminants by the snap action reinflation thereby allowing dislodged contaminants to fall by gravity through said continuously open end of said filters for collection in said collection means.

2. A filter facility as defined in claim 1 characterized in that said improvement includes means for periodically removing contaminants from said filters group-by-group while maintaining the remaining filter groups in operation.

3. A filter facility as defined in claim 1 characterized in the provision of means for discontinuing drawing a partial vacuum on filters undergoing cleaning when the walls thereof become deflated sufficiently to substantially cut off flow therethrough and thereupon initiating resumption of supply of contaminated gas to said deflated walls to re-inflate the same abruptly and with snap action to dislodge adhering contaminants, whereby the cleaning cycle of a selected group of said filters is carried out in the short interval required to deflate and then re-inflate the walls thereof.

4. A filter facility as defined in claim 1 characterized in the provision of means for cutting off communication of filters undergoing cleaning from the supply of contaminated gas an interval of time prior to starting to draw a partial vacuum on said cells.

5. A filter facility as defined in claim 4 characterized in the provision of means for discontinuing the step of drawing a partial vacuum on deflated filters a brief interval of time before resuming the supply of contaminated gas to the deflated cells.

6. In a contaminated gas filtering facility of the type having a plurality of groups of elongated tubular filters fixedly supported at both ends thereof, blower means for delivering contaminated gas under pressure to each of said filter groups, means structurally independent of said tubular filters for selectively closing off the flow of gas to each of said groups, suction means selectively connectable to each of said filter groups and operable substantially to cut off air flow to selected filters by circulating atmospheric air in reverse direction through the walls of said filter for the brief interval required to collapse the walls thereof inwardly against one another thereby substantially cutting off said reverse air flow, and control means for then discontinuing the flow of said filter-collapsing reverse air stream and immediately thereafter proceeding to re-establish the normal flow of contaminated gas in predetermined time relationship to reinflate the collapsed filters with snap action thereby to dislodge adhering deposits of contaminants.

7. A filtering facility as defined in claim 6 characterized in that said control means includes means operable to re-cycle the reconditioning of said filter group in predetermined time relation following a period of use to filter contaminants which period of use is many times longer than the brief interval required to recondition them.

8. A continuously operable, self-cleaning bag house for use with a continuously operating source of contaminated gas such as a cement kiln having an outlet for a stream of dust-laden, high-temperature products of combustion, said bag house comprising a roofed skeleton structure open to the atmosphere along its sides, a plurality of independently operable filtering sections, each of said sections including a plurality of vertically suspended fabric filter bags continuously closed at their upper ends and continuously open at their lower ends to underlying dust-collecting chambers, means immovably supporting both ends of each filter bag, the walls of said bags being free to collapse against one another and cut off gas flow therealong when the interior thereof is subjected to sub-atmospheric conditions, duct means including blower means for conveying a dust-laden stream of high-temperature products of combustion from a cement kiln into the lower ends of said filter bags, independently operable, normally-open inlet valve means controlling the entrance of said dirt-laden stream into each of said filtering sections, and by-pass means including normally closed outlet valve means connecting the lower ends of the bags in each of said filtering sections with the sub-atmospheric low pressure intake side of said blower means whereby the closing of the inlet valve and the opening of the associated outlet valve for a particular one of said filtering sections cuts off the incoming dust-laden stream and initiates a momentary reverse flow of atmospheric cleaning air inwardly through the walls of the bags in that section to collapse the bag walls together and to convey said atmospheric air from the lower ends of said filtering bags into said dust-laden stream on the intake side of said blower means for delivery into the remaining ones of said filtering sections whereby dislodged dust carried by said cleaning air is filtered out and left collected in said bag house, and means for closing off said reverse air flow as the filter bags become collapsed and for thereupon restoring the flow of dust-laden air into said collapsed bags to re-expand the same with snap action and abruptly thereby to expel the dust layer from the bag walls for gravity collection at the lower end of said bags.

9. In a bag house for filtering dust from a high-temperature stream issuing from a continuously operating cement kiln, the side walls of said bag house being freely open to the atmosphere along the upper portions of its sidewalls and housing therewithin a plurality of independently operable filtering sections each opening into underlying dust-collecting hopper means, said filtering sections each having a plurality of vertically suspended elongated flexible fabric bags in continuous open communication at one end with said hopper means and including means immovably supporting both ends of said bags at all times; that improvement which comprises means for delivering a hot stream of dust-contaminated gases issuing from said kiln into the lower ends of said filter sections for removal of the contaminants as the gas passes upwardly into and outwardly through the walls of said bags and for discharging the hot clean gas to the atmosphere through said open sidewalls, means for periodically and sequentially reconditioning individual ones of said filtering sections in rotation by removing adhering contaminants from the walls of the bags thereof, said reconditioning means comprising means for discontinuing the delivery of the gas stream into the lower end of the filtering section undergoing cleaning and inducing a flow of clean atmospheric air inwardly through the walls of the bags undergoing cleaning to collapse said bags inwardly thereby substantially cutting off said flow of clean air along the interiors thereof, means for passing the air streams so induced together with contaminants suspended therein back into the main gas stream flowing to the remainder of said sections until the bags of the section undergoing reconditioning are collapsed, means for restoring the flow of dust-contaminated gas into the continuously open lower ends of said collapsed bags to reinflate the same abruptly and with snap action thereby to dislodge deposits of dust therefrom, and means for reconditioning the other of said filtering sections in sequence as the filtering section last cleaned is returned to filtering service.

10. That improvement defined in claim 9 including means for passing said high-temperature contaminated gas stream issuing from the cement kiln in heat exchange with atmospheric air under conditions effective to cool the same to a temperature intermediate the high temperature at the outlet of the kiln and the dew point temperature of the moisture carried in said stream as it passes outwardly through the filter bags whereby said moisture remains ineffective to cake a dust layer adhering to the interior side of said filter bags.

11. That improvement defined in claim 9 including means for holding the opposite ends of said fabric filter bags stationary while undergoing reconditioning.

12. A continuously operable, self-cleaning bag house for use in removing dust from the gaseous products of a continuously operating source of hot contaminated gas, said bag house comprising a roofed skeleton housing therewithin a plurality of independently operable filtering sections each including a plurality of elongated tubular fabric bags having continuously closed upper ends and continuously open lower ends suspended vertically therewithin and free of internal components interfering with the free flexing of substantially all portions thereof, means immovably supporting the opposite ends of said tubular filter bags at all times, elongated duct means in heat exchange with the ambient air for conducting a main hot dust-laden stream from said source of hot contaminated gas to the open lower end of each of said filtering sections for simultaneous flow upwardly through the bags of each and outwardly through the walls thereof, means including valve means associated with the inlet end of each section and independent of both ends of said bags for selectively discontinuing the flow of dust-laden gases to any section and for connecting said selected section with a low pressure area in the dust-laden stream flowing from said source of gas to said bag house whereby said low pressure area and the velocity of said dust-laden stream is effective to induce a flow of clean atmospheric air inwardly through the walls of the bags to collapse the walls thereof substantially together and substantially cut off said flow of clean atmospheric air, and means for dislodging clean dust deposited on the collapsed bag wall by readmitting said dust-laden gases thereto whereby the abrupt reinflation of said bags causes the dust layer to be expelled from the bag walls without need for imparting axial movement to either end of said bags.

13. A bag house as defined in claim 12 characterized in that said duct means for conveying hot contaminated gas from said source to said bag house includes means for pre-cooling said hot contaminated gas prior to its discharge into said bag house to a temperature between 500 and 600 degrees F. thereby to avoid risk of damage to said fabric bags while maintaining the gas temperature above that at which condensation of moisture from said gas occurs during filtering thereof.

14. A bag house as defined in claim 12 characterized in the provision of automatic control means and of power operated actuators therefor connected in circuit and operable to cycle said valve means to clean said filtering sections progressively and individually in predetermined time relation, said control means being effective to restrict the cleaning period of each section to the time required to deflate and then to re-inflate the filter bags thereof through a single deflation-re-inflation cycle.

15. A bag house, comprising a tall skeleton roofed framework having large area air inlets and outlets adjacent the base and roof ends thereof, rows of dust collecting hoppers along the base and between the opposite sides of said framework, a plurality of elongated tubular fabric filter bags permanently closed at their upper ends and having their lower ends continuously in communication with an associated one of said hoppers, means immovably supporting the upper closed ends of said filter bags and holding the same stationary against axial movement during both filtering and reconditioning operations of said bag house, means including blower means and inlet valve means independent of either end of said filter bags for selectively delivering dust-laden gas to the lower ends of said filter bags, duct means including outlet valve means associated with each of said hoppers and including a duct connection with the low pressure inlet side of said blower means, said blower means being operable when the inlet valve for a selected hopper is closed and the outlet valve thereof is open to draw clean atmospheric air inwardly through the walls of a selected group of said stationarily suspended filter bags to deflate the same until said clean air flow substantially ceases, and means for re-inflating said deflated filter bags abruptly and with snap action to remove remaining portions of adhering dust whereby the sequential reversal of the inlet and outlet valves for the various hoppers in turn is effective to recondition periodically the group of bags associated therewith as the others remain in effective continuous filtering operation.

16. A bag house as defined in claim 15 characterized in the provision of independent power means for opening and closing each of said inlet and outlet valves from a common control station remote therefrom.

17. A bag house as defined in claim 15 characterized in that said hoppers are arranged in rows, and a dust-laden air distributing manifold extending lengthwise of and between adjacent rows, said manifold having branch ducts opening laterally into the hoppers of each of said filtering sections.

18. In combination, a plurality of groups of filters, automatic control mechanism adapted to control sequentially the cleaning of said groups of filters in a manner maintaining a predetermined number of groups in operation while at least one group is undergoing cleaning, said control mechanism including separate shafts and a continuously operating motor having meshing gear means for driving said separate shafts at different predetermined ratios, a first and slower one of said shafts being effective to select sequentially a group of filters to be cleaned, and a second and faster one of said shafts governing the programming of the different operations of the cleaning cycle for the filter group selected.

19. The combination defined in claim 18 characterized in that operatively associated with said first shaft is a plurality of cam controlled selector switches arranged to close sequentially for a predetermined time interval sufficient for the cleaning cycle of a filter group, said second shaft having a pair of cam controlled switches adapted to be connected in series with a particular pair of valve operating devices selected for operation by the operation of said first shaft and of the cam controlled switches thereon, said switches on said second shaft being operable in predetermined out of phase timed relation with one another.

20. A continuously operable self-cleaning filtering facility comprising a plurality of elongated tubular filters of flexible fabric material continuously open at one end thereof, means immovably supporting the opposite ends of said filters, means for supplying a large volume of gas under superatmospheric pressure to said continuously open end of said filters and including means for supplying gas to be filtered to said filters, means for removing deposit of filtered material from the interior surfaces of said filters including means for drawing a partial vacuum thereon to collapse the opposed wall portions of an individual filter inwardly against one another substantially throughout the length thereof, and means for thereupon activating said means for supplying gas under superatmospheric pressure to the open end of said collapsed filter to re-inflate the same progressively along its length and, in so doing, to undulate the walls of the filter in annular rings which advance therealong from said open end to flex the filter wall repeatedly and to flake the accumulated deposit therefrom.

21. That continuous method of processing a continuous stream of cement-laden gases issuing from the discharge end of a cement kiln which comprises passing said stream of cement-laden gases in heat exchange with a cooling medium to precool the gases, placing said gases under superatmospheric pressure, dividing said precooled stream by delivering portions thereof into one end of a plurality of vertically suspended elongated tubular filter bags supported at either end against substantial axial movement and free of restraints between said ends, maintaining said tubular filters normally taut by the pressurized gases delivered thereto and undergoing filtering, discharging the filtered gas escaping through the walls of said filter bags to the atmosphere, periodically discontinuing the supply of cement-laden gases progressively to different groups of said bags and then subjecting the interior of said one group of bags at a time to sub-atmospheric pressure momentarily for the brief period required to collapse opposed wall portions of individual bags together, and then resuming the supply of cement-laden gases to the collapsed bags and at a rate adequate to re-inflate said bags to a taut condition abruptly and with snap-action thereby to expel adhering cement dust inwardly and away from the bag walls by said snap-action re-inflation, and collecting the expelled cement falling by gravity through the lower ends of said bags.

22. That method defined in claim 21 characterized in the step of resuming the supply of pressurized cement-laden gases to one of said collapsed filter bags at a rate effective to create a traveling wave in the side walls of said bags as the same snap taut to undulate said walls progressively from one end toward the other end thereof and wherein said traveling wave undulations are effective to peel adhering cement from the bag walls.

23. That method defined in claim 21 characterized in the step of passing relatively cool atmospheric air over the exterior sides of said filter bags in amounts regulated to aid in cooling said filter bags to a temperature above the dewpoint of the moisture normally present in cement kiln gases at the temperature prevailing in said gases while undergoing filtering in said filter bags.

24. That continuous method of processing a stream of hot dust-laden gases to separate dust and foreign particles therefrom by passing the same through porous flexible tubular filters until dirty and then progressively reconditioning said filters in groups, said method comprising immovably supporting the opposite ends of a plurality of groups of tubular filters in closely spaced side-by-side relation with their exteriors exposed to the atmosphere, holding one end of said filters normally closed and maintaining the other end continuously open and substantially unrestricted, circulating dirty gas to be filtered under superatmospheric pressure into said filters through said continuously open end and collecting the dirt therefrom on the interiors of said filters as the substantially clean gas escapes through the walls of the filters into the atmosphere, periodically reconditioning said filters by discontinuing the supply of dirty gas to at least one of said filters and placing the same under sub-atmospheric pressure to draw atmospheric air inwardly through the walls thereof and utilizing said sub-atmospheric pressure to produce a flow of air through one end of said one filter until the inflowing air is substantially throttled and cut off by the inward collapse of the filter walls toward and against one another, and then re-establishing the flow of pressurized gas through one end only of said one filter at a rate effective to re-inflate the same abruptly and with snap action beginning at said one end and progressing rapidly to the other end thereby to dislodge dirt collected on the interior surfaces thereof for gravity flow toward the lower end of said one filter, and thereafter progressively repeating said filter reconditioning by abruptly re-inflating collapsed filters with snap action using pressurized gas to break a sub-atmospheric condition within the filter undergoing reconditioning.

25. That method defined in claim 24 characterized in the step of processing each of said filters through said reconditioning cycle automatically and in predetermined order in a brief time period of about 2 to 3 minutes duration followed by a high efficiency filtering time period many times longer.

26. A continuously operable self-cleaning gaseous fluid filter assembly comprising means supporting a plurality of generally tubular flexible-walled filters permanently closed at one end with the opposite ends thereof held stationary during both normal filtering and reconditioning of said filters, means dividing said filters into groups, means for supplying contaminated gas to said filters, reconditioning means for periodically removing accumulated contaminants from the walls of said filters including means for discontinuing the supply of contaminated gases to one group of filters and for reducing the pressure interiorly thereof until the sidewalls collapse against one another, and means for removing adhering contaminants from said collapsed filters by re-inflating said collapsed filters suddenly and with snap action utilizing contaminated gas under pressure whereby said snap action re-inflation dislodges adhering contaminants from the sidewalls thereof, said means for collapsing said filters including suction means having the inlet thereof connectable to the group of filters to be collapsed and the outlet end thereof discharging into the contaminated gas flowing to filters in use to filter contaminants whereby contaminants dislodged from said filters and remaining in suspension when leaving filters undergoing reconditioning are conducted into other filter groups for filtering.

27. A self-cleaning filter facility as defined in claim 26 characterized in the provision of bleeder passage means interconnecting each of said filter groups and effective to minimize the pressure gradient between an operating filter group and a filter group undergoing reconditioning thereby reducing the severity of the snap action imparted to the walls of the filters as these walls shift from deflated to inflated condition.

References Cited by the Examiner

UNITED STATES PATENTS

| | | | |
|---|---|---|---|
| 1,240,305 | 9/1917 | Brooks et al. | 55—273 |
| 1,764,861 | 6/1930 | Van Gelder. | |
| 1,784,339 | 12/1930 | Clasen | 183—57 |
| 1,806,513 | 5/1931 | Straus–Scharine | 183—57 X |
| 1,974,952 | 9/1934 | Eiben | 183—57 X |
| 2,276,805 | 3/1942 | Tolman | 183—57 |
| 2,471,426 | 5/1949 | Grant | 161—1 |
| 2,536,256 | 1/1951 | Berg | 161—1.5 |
| 2,674,342 | 4/1954 | Antonelli | 55—286 |
| 2,682,316 | 6/1954 | Kaufmann | 55—293 |
| 2,695,681 | 11/1954 | Boesger | 55—287 |
| 2,765,047 | 10/1956 | Hersey | 183—57 |

FOREIGN PATENTS

| | | |
|---|---|---|
| 526,303 | 2/1954 | Belgium. |
| 518,461 | 2/1931 | Germany. |
| 610,047 | 1935 | Germany. |
| 903,890 | 1954 | Germany. |
| 551,001 | 2/1943 | Great Britain. |
| 796,414 | 6/1958 | Great Britain. |
| 322,604 | 8/1957 | Switzerland. |

HARRY B. THORNTON, *Primary Examiner.*
GEORGE D. MITCHELL, HERBERT L. MARTIN, WESLEY S. COLE, WALTER BERLOWITZ,
*Examiners.*
M. A. CHAMPION, *Assistant Examiner.*